(12) United States Patent
McNally

(10) Patent No.: US 7,451,017 B2
(45) Date of Patent: Nov. 11, 2008

(54) ENERGY AND COST SAVINGS CALCULATION SYSTEM

(75) Inventor: James T. McNally, Lindenhurst, IL (US)

(73) Assignee: Siemens Building Technologies, Inc., Buffalo Grove, IL (US)

( * ) Notice: Subject to any disclaimer, the term of this patent is extended or adjusted under 35 U.S.C. 154(b) by 0 days.

(21) Appl. No.: 11/772,436

(22) Filed: Jul. 2, 2007

(65) Prior Publication Data

US 2007/0244604 A1    Oct. 18, 2007

Related U.S. Application Data

(63) Continuation of application No. 11/118,598, filed on Apr. 28, 2005, now abandoned.

(60) Provisional application No. 60/647,100, filed on Jan. 26, 2005.

(51) Int. Cl.
*G01M 1/38* (2006.01)
*G05B 13/00* (2006.01)
*G05B 15/00* (2006.01)

(52) U.S. Cl. ............ 700/291; 700/275; 700/276; 700/278

(58) Field of Classification Search ........... 700/275, 700/276, 278, 291
See application file for complete search history.

(56) References Cited

U.S. PATENT DOCUMENTS

| | | | |
|---|---|---|---|
| 5,377,307 A | 12/1994 | Hoskins et al. | |
| 5,559,690 A | 9/1996 | Keeler et al. | |
| 5,924,486 A * | 7/1999 | Ehlers et al. | 165/238 |
| 6,172,616 B1 | 1/2001 | Johnson et al. | |
| 6,185,483 B1 | 2/2001 | Drees | |
| 6,207,936 B1 | 3/2001 | de Waard et al. | |
| 6,415,205 B1 * | 7/2002 | Myron et al. | 700/275 |
| 6,577,962 B1 | 6/2003 | Afshari | |
| 6,636,197 B1 | 10/2003 | Goldenberg et al. | |
| 6,785,592 B1 * | 8/2004 | Smith et al. | 700/291 |
| 6,904,385 B1 * | 6/2005 | Budike, Jr. | 702/182 |
| 7,130,719 B2 * | 10/2006 | Ehlers et al. | 700/276 |

(Continued)

OTHER PUBLICATIONS

J. Stuart McMenamin & Frank A. Monforte, *Using Neural Networks for Day-Ahead Forecasting*, Itron Technical White Paper.

(Continued)

*Primary Examiner*—Michael D Masinick
(74) *Attorney, Agent, or Firm*—Rashmi S. Raj

(57) ABSTRACT

An Energy and Cost Savings Calculation System is provided that automates the determination of energy and cost savings due to energy conservation measures. The system provides Multi-Variant, Non-Linear (MVNL) load forecasting techniques, energy and cost savings calculations, and Weather Ranking. The load forecasting technique may accept numerous external parameters as input. The technique may use multiple Baselines. It may also use multiple Basic Reference Periods to reduce the load forecasting error. The load forecasting technique may utilize external parameters that are updated on a daily basis, such as dry bulb temperature, dew point temperature, solar condition, and interval meter data. The technique may use Baseline Extensions to perform forecasts and Reference Period Modifications to enhance accuracy. The system may calculate energy and cost savings using Complex Rates and time-of-use (TOU) energy data. The system may rank a plurality of sources providing weather data to identify the most accurate weather data.

18 Claims, 15 Drawing Sheets

U.S. PATENT DOCUMENTS

| | | | |
|---|---|---|---|
| 2001/0020219 A1 | 9/2001 | Kishlock et al. | |
| 2003/0050738 A1 | 3/2003 | Masticola et al. | |
| 2004/0215529 A1 | 10/2004 | Foster et al. | |
| 2006/0065750 A1* | 3/2006 | Fairless | 236/46 R |
| 2006/0167591 A1* | 7/2006 | McNally | 700/291 |

OTHER PUBLICATIONS

Marcin Wojnarski, *Modeling the Bank Client's Behavior with LTF-C Neural Network*, Institute of Informatics, Warsaw University.

J. Stuart McMenamin, et al., *Statistical Approaches to Electricity Price Forecasting*, Itron Technical White Paper.

J. Stuart McMenamin, *Why Not Pi? A Primer on Neural for Forecasting*, Itron Technical White Paper.

Itron, *Metrix ND The Tool of Choice by Energy Forecasters*, Power Point Presentation.

*Eunite competition*, Power Point Presentation.

*Electrical Load Forecasting Methods*, available at http://www.aclillc.com/electric_load_forecasting1.htm.

Itron, *Meter Data Management*.

Hippert et al., *Neural Networks for Short-term Load forecasting: A review and evaluation*, IEEE Transactions on power systems, col. 16, No. 1, Feb. 2001.

* cited by examiner

FIG. 7

Subject: USC Reports MONTHRECAP:Chicago Branch (01/31/2004) (1)

WEATHER AND ENERGY REPORT [Chicago Branch] [ 1/31/2004] [Chicago,IL (US)]

|  | High | Low | Condition | KW | KWH | GAS | Steam | Ch.Water |
|---|---|---|---|---|---|---|---|---|
| Actual |  | 18 | 16 Partly Cloudy | 32 | 594 |  |  |  |
| Expected |  |  |  | 29 | 560 |  |  |  |
| Percentage |  |  |  | 109% | 106% |  |  |  |

FIVE-DAY WEATHER AND ENERGY REPORT [Chicago Branch] [ 1/31/2004] [Chicago,IL (US)]

| Date | Day | High | Low | Condition | KW | KWH | GAS | Steam | Ch.Water |
|---|---|---|---|---|---|---|---|---|---|
| 02/01/2004 | Sun | 30 | 29 | Mostly Cloudy | 32 | 576 |  |  |  |
| 02/02/2004 | Mon | 34 | 31 | PM Wintry Mix | 68 | 1146 |  |  |  |
| 02/03/2004 | Tue | 31 | 12 | AM Snow Showers | 72 | 1146 |  |  |  |
| 02/04/2004 | Wed | 23 | 18 | Mostly Sunny | 72 | 1129 |  |  |  |
| 02/05/2004 | Thu | 31 | 30 | PM Snow/Wind | 72 | 1132 |  |  |  |

FIG. 8

| BP ID | Date Ranges (Billing Periods) FROM | TO | Days | Last Year Total KWH | Baseline1: Weather Adjusted KWH | Baseline2: Weather+ Adjusted KWH | This Year Total KWH | Difference This Yr-BL2 KWH | % Diff | This Year HDD | This Year CDD | Baseline KWH /HDD | Baseline KWH /CDD | This Year KWH /HDD | This Year KWH /CDD |
|---|---|---|---|---|---|---|---|---|---|---|---|---|---|---|---|
| | TOTALS: | | 365 | 8,549,350.1 | 8,409,923.3 | 8,409,923.3 | 8,235,605.1 | -174,318.2 | -2.1% | 6,543 | 637 | | | | |
| 1 | 4/1/2003 | 4/30/2003 | 30 | 672,659.3 | 651,467.9 | 651,467.9 | 692,502.9 | 41,035.0 | 5.9% | 558 | 11 | 1,167 | 59,224 | 1,241 | 62,954 |
| 2 | 5/1/2003 | 5/31/2003 | 31 | 705,762.6 | 683,926.0 | 683,926.0 | 666,519.7 | -17,406.3 | -2.6% | 323 | 3 | 2,117 | 227,975 | 2,063 | 222,173 |
| 3 | 6/1/2003 | 6/30/2003 | 30 | 784,871.5 | 750,815.4 | 750,815.4 | 725,123.5 | -25,691.9 | -3.5% | 83 | 100 | 9,045 | 7,508 | 8,736 | 7,251 |
| 4 | 7/1/2003 | 7/31/2003 | 31 | 837,213.0 | 824,022.5 | 824,022.5 | 784,421.8 | -39,600.7 | -5.0% | 2 | 198 | 412,011 | 4,161 | 392,210 | 3,961 |
| 5 | 8/1/2003 | 8/31/2003 | 31 | 805,546.7 | 812,302.7 | 812,302.7 | 792,387.4 | -19,915.3 | -2.5% | 1 | 255 | 812,302 | 3,185 | 792,387 | 3,107 |
| 6 | 9/1/2003 | 9/30/2003 | 30 | 736,733.9 | 735,391.0 | 735,391.0 | 703,064.5 | -32,326.5 | -4.6% | 124 | 70 | 5,930 | 10,505 | 5,669 | 10,043 |
| 7 | 10/1/2003 | 10/31/2003 | 31 | 673,776.7 | 695,620.8 | 695,620.8 | 698,181.7 | 2,560.9 | 0.4% | 517 | 0 | 1,347 | 0 | 1,352 | 0 |
| 8 | 11/1/2003 | 11/30/2003 | 30 | 631,788.9 | 625,303.8 | 625,303.8 | 620,304.9 | -4,998.9 | -0.8% | 720 | 0 | 868 | 0 | 861 | 0 |
| 9 | 12/1/2003 | 12/31/2003 | 31 | 664,404.8 | 670,432.3 | 670,432.3 | 628,554.2 | -41,878.1 | -6.7% | 1,041 | 0 | 644 | 0 | 603 | 0 |
| 10 | 1/1/2004 | 1/31/2004 | 31 | 719,237.5 | 703,432.9 | 703,432.9 | 658,299.8 | -45,133.1 | -6.9% | 1,366 | 0 | 514 | 0 | 481 | 0 |
| 11 | 2/1/2004 | 2/29/2004 | 29 | 622,354.1 | 620,424.9 | 620,424.9 | 618,951.6 | -1,473.3 | -0.2% | 1,053 | 0 | 589 | 0 | 587 | 0 |
| 12 | 3/1/2004 | 3/31/2004 | 31 | 688,000.1 | 635,783.2 | 635,783.2 | 646,293.1 | 10,510.0 | 1.6% | 755 | 0 | 842 | 0 | 856 | 0 |

Notes:
1. Baseline1 is weather-adjusted simulation based of actual energy use data from 1/1/02 through 2/28/03. It is adjusted to "This Year's" weather.
2. Baseline2 is weather-adjusted simulation further adjusted by internal changes such as floor area, additions, lighting changes, etc.
3. "This Year" is the period from 4/1/03 to 3/31/04
4. "HDD" = Heating degree-days  "CDD"=Cooling degree-days.
5. Values in Blue represent partially filled and empty Data Ranges

FIG. 10B

| BP ID: | Totals | 1 | 2 | 3 | 4 | 5 | 6 | 7 | 8 | 9 | 10 | 11 | 12 |
|---|---|---|---|---|---|---|---|---|---|---|---|---|---|
| Date From: | 1/1/03 | 1/1/03 | 2/1/03 | 3/1/03 | 4/1/03 | 5/1/03 | 6/1/03 | 7/1/03 | 8/1/03 | 9/1/03 | 10/1/03 | 11/1/03 | 12/1/03 |
| Date To: | 12/31/03 | 1/31/03 | 2/28/03 | 3/31/03 | 4/30/03 | 5/31/03 | 6/30/03 | 7/31/03 | 8/31/03 | 9/30/03 | 10/31/03 | 11/30/03 | 12/31/03 |

Actual On-Going

Actual Consumption [KWH]
| | Totals | 1 | 2 | 3 | 4 | 5 | 6 | 7 | 8 | 9 | 10 | 11 | 12 |
|---|---|---|---|---|---|---|---|---|---|---|---|---|---|
| Off-Peak Cons. | 3,800,156 | 357,033 | 286,153 | 321,740 | 321,564 | 302,596 | 321,570 | 361,686 | 382,161 | 327,390 | 311,739 | 284,622 | 291,903 |
| On-Peak Cons. | 3,183,348 | 265,616 | 218,631 | 237,694 | 262,926 | 242,332 | 273,289 | 311,391 | 307,674 | 280,450 | 277,776 | 203,010 | 222,559 |
| Total | 6,983,503 | 622,649 | 504,784 | 559,434 | 584,490 | 544,929 | 594,860 | 673,077 | 689,834 | 607,840 | 589,515 | 497,633 | 514,460 |

Actual Demand [KW]
| | Totals | 1 | 2 | 3 | 4 | 5 | 6 | 7 | 8 | 9 | 10 | 11 | 12 |
|---|---|---|---|---|---|---|---|---|---|---|---|---|---|
| Summer Dema | 1,371 | 0 | 0 | 0 | 0 | 0 | 0 | 1,341 | 1,371 | 1,286 | 0 | 0 | 0 |
| Non-Summer | 1,353 | 1,132 | 1,031 | 1,092 | 1,233 | 1,146 | 1,353 | 0 | 0 | 0 | 1,290 | 1,160 | 1,030 |

FIG. 10C

| Actual Cost | | | | | | | | | | | | | |
|---|---|---|---|---|---|---|---|---|---|---|---|---|---|
| Off-Peak Cons. | $99,834 | $8,358 | $6,699 | $7,532 | $7,528 | $7,084 | $7,528 | $8,467 | $8,946 | $7,664 | $7,298 | $6,897 | $6,833 |
| On-Peak Cons. | $173,756 | $14,872 | $12,241 | $13,309 | $14,721 | $13,569 | $15,301 | $17,435 | $17,227 | $15,702 | $15,553 | $11,357 | $12,461 |
| Summer Dem. | $57,071 | $0 | $0 | $0 | $0 | $0 | $0 | $0 | $0 | $10,458 | $0 | $0 | $0 |
| Non-Summer | $116,608 | $12,594 | $11,488 | $12,159 | $13,725 | $12,753 | $15,167 | $19,095 | $19,516 | $0 | $14,356 | $12,911 | $11,461 |
| Tax | $6,359 | $565 | $463 | $527 | $527 | $495 | $527 | $593 | $626 | $536 | $511 | $463 | $470 |
| Total | $444,628 | $36,469 | $30,889 | $33,527 | $36,501 | $33,901 | $38,524 | $45,599 | $46,315 | $42,363 | $37,718 | $31,657 | $31,234 |

FIG. 10D

| Baseline | | | | | | | | | | | | |
|---|---|---|---|---|---|---|---|---|---|---|---|---|
| AdjustFactor | 1 | 1 | 1 | 1 | 1 | 1 | 1 | 1 | 1 | 1 | 1 | 1 |
| Baseline Consumption [KWH] | | | | | | | | | | | | |
| Off-Peak Cons. | 3,974,862 | 334,397 | 289,214 | 315,067 | 293,367 | 318,820 | 346,315 | 377,562 | 388,956 | 340,436 | 317,900 | 321,321 | 321,597 |
| On-Peak Cons. | 3,100,062 | 257,034 | 243,365 | 232,786 | 247,635 | 247,892 | 278,871 | 301,662 | 295,790 | 272,103 | 273,281 | 213,625 | 246,018 |
| Total | 7,074,924 | 591,431 | 532,579 | 547,854 | 541,002 | 566,711 | 625,187 | 679,224 | 684,747 | 612,539 | 591,091 | 534,946 | 567,615 |
| Baseline Demand [KW] | | | | | | | | | | | | |
| Summer Dema | 1,362 | 0 | 0 | 0 | 0 | 0 | 0 | 1,286 | 1,362 | 1,232 | 0 | 0 | 0 |
| Non-Summer | 1,316 | 1,098 | 1,083 | 1,039 | 1,149 | 1,135 | 1,316 | 0 | 0 | 0 | 1,131 | 1,049 | 1,046 |

FIG. 10E

| | | | | | | | | | | | | |
|---|---|---|---|---|---|---|---|---|---|---|---|---|
| Baseline Cost | | | | | | | | | | | | |
| Off-Peak Cons. | $93,052 | $7,828 | $7,085 | $7,376 | $6,068 | $7,464 | $8,107 | $8,838 | $9,105 | $7,970 | $7,140 | $7,522 | $7,528 |
| On-Peak Cons. | $186,004 | $15,422 | $14,002 | $13,957 | $14,658 | $14,873 | $16,732 | $18,400 | $17,747 | $16,326 | $16,397 | $12,817 | $14,761 |
| Summer Dema | $55,261 | $0 | $0 | $0 | $0 | $0 | $14,645 | $0 | $18,399 | $17,546 | $0 | $0 | $0 |
| Non-Summer | $111,817 | $12,221 | $12,055 | $11,557 | $12,765 | $12,644 | $0 | $0 | $0 | $0 | $12,504 | $11,677 | $11,638 |
| Tax | $6,514 | $548 | $490 | $516 | $481 | $522 | $568 | $618 | $637 | $538 | $521 | $527 | $527 |
| Total | $452,647 | $36,019 | $33,552 | $33,426 | $34,982 | $35,504 | $40,052 | $45,874 | $46,089 | $42,400 | $36,911 | $32,544 | $34,454 |

FIG. 10F

| Savings | | | | | | | | | | | |
|---|---|---|---|---|---|---|---|---|---|---|---|
| Energy Savings | | | | | | | | | | | |
| Consumption | 91,421 | -31,210 | 27,795 | -11,581 | -43,498 | 21,702 | 30,327 | 6,147 | -5,088 | 4,700 | 1,576 | 37,313 | 53,154 |
| Demand | -558 | -34 | 52 | -53 | -84 | -10 | -47 | -55 | -8 | -64 | -159 | -111 | 46 |
| Cost Savings | | | | | | | | | | | |
| Net Savings | $8,019 | $-390 | $2,663 | $-101 | $-1,509 | $1,603 | $1,528 | $284 | $573 | $37 | $-776 | $696 | $3,221 |

ENERGY AND COST SAVINGS CALCULATION SYSTEM

PRIORITY AND CROSS-REFERENCE TO RELATED APPLICATION

This application is a continuation of application Ser. No. 11/118,598, filed Apr. 28, 2005, which claims the benefit of the filing date under 35 U.S.C. § 119(e) of Provisional U.S. Patent Application Ser. No. 60/647,100, filed on Jan. 26, 2005, which is incorporated by reference in its entirety herein.

FIELD

The present invention relates generally to systems for monitoring energy use parameters within a building. More particularly, the present invention relates to systems for predicting thermal and power use conditions to be encountered by a building and by virtue of comparing the predicted conditions with actual conditions, the energy and cost savings may be determined.

BACKGROUND

Most commercial properties include a number of building systems that monitor and regulate various functions of the building for the comfort and well-being of the occupants. These building systems include security systems, fire control systems, elevator systems, and/or building environmental system.

A building environmental system regulates the temperature and flow of air throughout a building. The air conditioning for a building typically includes one or more chillers for cooling air and one or more heaters for heating air. Fans distribute air conditioned by a chiller or a heater into a duct system that directs the flow of air to the various rooms of a building. Dampers located within the duct system may be opened or closed by actuators. Also, the speed of a motor that drives a fan is controlled to regulate air flow within the system. An important component of a building environmental management system is the control system that varies the fan motor speed and the position of the various dampers to maintain the desired conditions within the building.

Energy Service Companies (ESCO) currently undertake projects, frequently referred to as performance contracts, which guarantee a specific level of performance for building environmental systems sold to clients. The performance relates to improved facility operations which generate reduced operating costs for the client. The ESCO typically identifies the amount of reduction in operating cost which will occur, i.e., the energy or cost savings, but also may guarantee to the client that the energy or cost savings will occur. After installation of a building environmental system or energy conservation measure, to verify that the energy and cost savings are actually occurring, the energy usage of the facility after the retrofits is compared to the energy usage prior to the retrofits.

However, conventional computer software packages that calculate the energy and cost savings have only a limited number of variables that can be applied to reflect weather and usage changes. For example, energy and cost savings software may be limited to accepting only monthly utility or meter data. As a result, the conventional computer software packages produce energy and cost savings calculations that may have unacceptably high error rates. Unreliable energy and cost savings calculations may prevent the accurate calculation of energy and cost savings for energy conservation measures and building environmental systems installed at customer locations. Thus, the energy and money saved by the energy conservation projects, such as the savings required by a performance contract, cannot be easily and reliably proven. Inaccurate cost savings calculations also may hinder reliable financial planning as the actual amount of energy expended, as well as the associated cost for each unit of energy, cannot be timely ascertained.

BRIEF SUMMARY

An Energy and Cost Savings Calculation System is provided that automatically determines the energy and cost savings due to the installation of energy conservation measures. The system provides a manner by which customers may prove that energy conservation projects are actually saving energy and money. The system provides regular updates of savings progress and calculates accurate and reliable energy and/or cost savings.

The Energy and Cost Savings Calculation System may utilize a Multi-Variant, Non-Linear (MVNL) load forecasting technique. The load forecasting technique may accept numerous types of input data and use multiple Reference Periods within the Baseline to reduce the error associated with load forecasting. Additionally, the load forecasting technique may use Reference Period Modification (within the Baseline) as needed to more accurately capture the range of actual outside air temperatures experienced in the Reporting Period.

The Energy and Cost Savings Calculation System may support time-of-use electric rates. The system calculates energy and cost savings using Complex Rates. The system also may rank a plurality of sources providing weather data to identify the most accurate weather data.

In one embodiment, a data processing system for forecasting energy loads is provided. The system includes a processing unit operable to receive a plurality of external parameters. The processing unit forecasts energy loads for a building based upon simulating the operation of building energy-using equipment.

In another embodiment, a data processing system for forecasting energy loads is provided. The system includes a processing unit operable to receive a plurality of variables that are updated at least daily. The processing unit forecasts energy loads for a building based upon the variables. The variables may include daily weather, energy, and interval meter data.

In another embodiment, a method for forecasting energy loads is provided. The method includes receiving weather and energy data, the weather and energy data containing information regarding a plurality of parameters. The method also includes calculating multiple Reference Periods within the Baseline from the weather and energy data, each Reference Period corresponding to a different time period, and forecasting energy loads for a building using the multiple Reference Periods.

In yet another embodiment, a computer-readable medium having instructions executable on a computer stored thereon is provided. The instructions include receiving weather data associated with a plurality of weather parameters, receiving energy data associated with energy usage, and forecasting the energy load for a building during a specific time period by using Multi-Variant Non-Linear technique.

Advantages of the system will become more apparent to those skilled in the art from the following description of the preferred embodiments of the invention which have been shown and described by way of illustration. As will be real-

BRIEF DESCRIPTION OF THE DRAWINGS

FIG. 7 illustrates an exemplary weather and energy report;

FIG. 8 illustrates an exemplary comparative energy use report that displays weather-adjusted comparisons;

FIGS. 10A through 10F illustrate an exemplary annual meter report.

DETAILED DESCRIPTION

Figure 1:
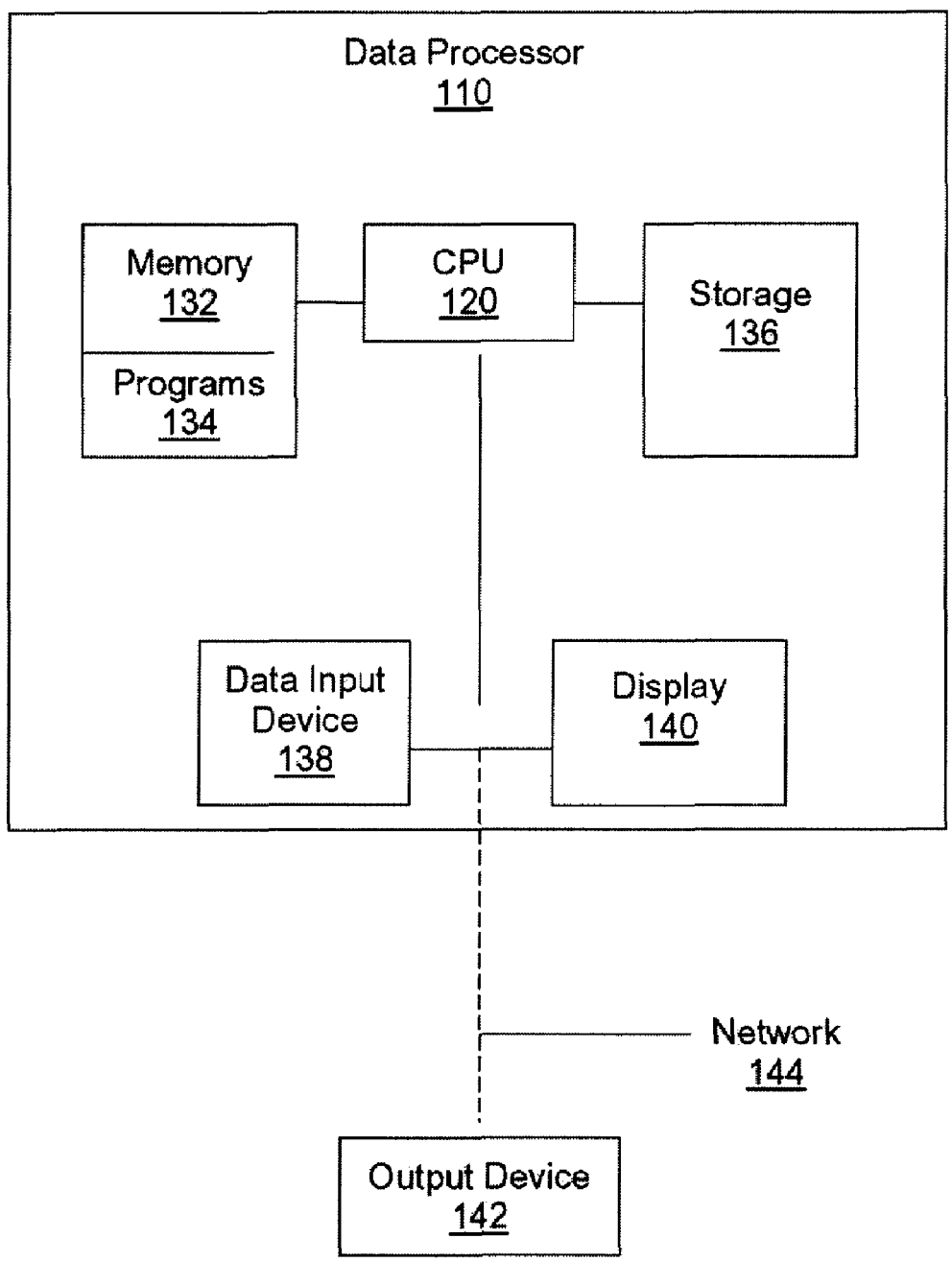
FIG. 1 illustrates an exemplary data processor configured or adapted to provide the functionality of the Energy and Cost Savings Calculation System.

The Energy and Cost Savings Calculation System provides Multi-Variant, Non-Linear (MVNL) load forecasting techniques, energy and cost savings calculations, and Weather Ranking. The Energy and Cost Savings Calculation System forecasts energy and cost savings for energy conservation measures installed at customer locations. The system may support the performance of the contracting business by enhancing the evaluation of performance contracts. For instance, the system may reduce the amount of labor expended in calculating the energy and cost savings associated with performance contracts. Additionally, the system provides customers with a manner by which to prove that the energy conservation projects are actually saving energy and money. The system may reside on a global energy information platform.

The Energy and Cost Savings Calculation System provides regular updates of the savings progress. The system also may calculate actual project slip, as well as forecast project savings and slip into the future. Furthermore, the system may calculate energy and cost savings using utility bills and/or simulations for a Basic Reference Period. The same simulation tool used to establish the Baseline also may be used for the calculation of energy and cost savings.

Load forecasting or calculating is the prediction of building energy usage (i.e., electricity, gas, steam, etc.) based upon external parameters. For example, load forecasting applications may calculate cost savings of conservation measures and projects. Performance contracts often include provisions to verify promised energy and cost savings. Verification of savings may be accomplished by establishing a base or reference period representing energy usage patterns before the conservation measures of the performance contract were implemented. For several years after the conservation measures have been initiated, the energy usage during the Baseline period is compared to the on-going energy usage of the facility.

Load forecasting may be used in monitoring and verification (M&V) calculations and calculating future loads, as well as used to spot abnormalities and compare energy usage for the current year with the previous year or other time period. Load forecasting also may be used to predict a daily expected consumption and peak, either of which may be useful when compared against the actual daily consumption and peak data to warn of near-term faulty operation. A five-day or other period daily consumption and peak load forecast may provide valuable operational information to warn against future excessive loads.

I. Adjustments

A comparison of the current year's operation with the previous year's operation is one yardstick of operational efficiency and may evidence "continuous improvement" as suggested by ISO-14001 standards. However, there are inevitably a number of year-to-year changes. Of course, the weather is not identical for any substantial length of time from one year to the next. Additionally, the use or primary purpose of a facility may deviate, internal changes may have been made to a facility, or one or more building additions may have been completed. Therefore, the comparison of the present year to the previous year may need adjustments to be reliable, such as adjustments for weather differences, operational changes, internal load changes, and building additions.

The cost savings associated with energy conservation projects are often of keen interest to management involved in making such changes. The verification of energy and cost savings may involve all of the various parameters discussed above, or others, such as energy rates. Rates may be simple, such as "cost per unit consumed," or more complex and involve time-of-use elements (e.g., on-peak, off-peak, and shoulder electric rates), demand charges, rate holidays, real-time rates, ratchets, block structures, and taxes. Rates may be the same for the base period and the present period or the rates may vary. Within either the base or the present period, the rate may have sub-rates that change each month.

II. Non-Linear Regression

Load forecasting based upon Multi-Variant Non-Linear (MVNL) technology has a much smaller error per time period than that of popular linear regression techniques. The load forecasting may be performed by Multi-Variant Non-Linear modeling based upon interval data, such as interval data received directly from meters associated with a portion of a building or individual pieces of equipment.

The MVNL technique may employ Baselines, Baseline Extensions, Reporting Periods, Basic Reference Periods, and Reference Period Modifications, as defined herein. A Baseline refers to the energy use characteristics in the period of time against which energy savings will be measured. A Baseline is usually between one and three consecutive years.

In the context of the MVNL technology, a Baseline Extension refers to what the energy use would be in a time other than the Baseline period of time if it had the same characteristics. The Baseline may be extended both forward and backwards in time by the Baseline Extension.

A Reporting Period refers to the smallest period of time in which energy and cost savings are disclosed. For example, an annual report with savings disclosed monthly would have a Reporting Period of one month.

A Basic Reference Period refers to the period of time within the Baseline whose weather conditions most closely resemble those of the Reporting Period. For example, if the Baseline is the calendar year 2004 and the Reporting Period is July 2005, then the Basic Reference Period is July 2004.

A Reference Period Modification refers to a modification of the Basic Reference Period. At times, the best weather fit requires the Basic Reference Period to be adjusted. There are several techniques to modify the Basic Reference Period. One such technique is to add days on both sides to better represent the weather found in the Reporting Period. Alternate Reference Period Modifications also may be used.

More specifically, the MVNL load forecasting may include the use of multiple Reference Periods within the Baseline to further reduce the error between the forecast and the actual energy loads. The MVNL load forecasting technique also may use Reference Period Modifications as needed. Reference Period Modifications may enhance the capture of the range of an external parameter during the reporting period, such as the outside air temperatures (OAT). An accurate representation of the outside air temperature is desirable because the outside air temperature is a major contributor to building thermal loads. For example, a change in the average monthly temperature of five or ten degrees will impact actual loads.

Reference Period Modifications may compensate for deviations in outside air temperatures from year to year. An overall benchmark, or Baseline, may be established from weather and energy usage data collected over one or more years. The Baseline may be divided into Basic Reference Periods corresponding to specific time periods. For instance, each calendar month may be a separate Basic Reference Period, and each Basic Reference Period may have a separate temperature range.

A Basic Reference Period is intended to be based upon weather data that approximately matches the weather experienced during the current reporting period. If the weather from the Basic Reference Period and the current reporting period approximately match, the energy usage associated with the Basic Reference Period may be used as a starting point in calculating the energy usage during the current reporting period.

Ideally, one would be able to simply use the corresponding month within the Baseline as the Reference Period. However, the weather deviates from year to year.

Accordingly, if the outside air temperature of the current reporting period is outside the Basic Reference Period temperature range, the Basic Reference Period may be adjusted by a Reference Period Modification. The Reference Period Modification is intended to more accurately reflect the weather and the accompanying effect of the weather on energy usage. The Basic Reference Period may be extended, either further into the past and/or into the future, until the outside air temperature range of the current reporting period falls within the Modified Reference Period temperature range. The Basic Reference Period may be widened by a month on either side. The Basic Reference Period also may be widened by a specific number of days on either side. Alternatively, the Basic Reference Period may consist of selected discontinuous days within a Baseline or a Baseline Extension to more accurately reflect the weather and the accompanying effect of the weather on energy usage.

The MVNL load forecasting technique may use the dew point temperature as an external parameter or input item. The dew point temperature indicates the moisture in the air. The dew point temperature contributes load to an air conditioning system, especially during the summer months.

The MVNL load forecasting technique also may use solar conditions as an external parameter. The effect of the sun is a major contributor to building thermal load. Solar conditions may be received from weather data providers, such as: sunny, partly sunny, overcast, partly cloudy, cloudy, scattered clouds, light rain, showers, haze, mist, clear, snow, or the like.

Each solar condition may be assigned a corresponding weighting coefficient. A weighting coefficient may be larger for the amount of sunlight on a given day. In one embodiment, a solar condition of sunny may be assigned a weighting coefficient of 1.0, while a solar condition of a rainy day may be assigned a weighting coefficient of 0.3. In another embodiment, the solar condition may be derived from the "Condition" term provided by the National Weather Service (NWS), which may be parsed to determine a weighting coefficient reflecting the amount of sun received. However, additional or different solar conditions and corresponding weighting coefficients also may be used.

Furthermore, the load forecasting technique may use the type of day as an input item. The type of day, such as being a weekday, a weekend, or a holiday, may be a major determinant of the energy usage in a building. A building may be presumed to be substantially occupied on a weekday and primarily unoccupied on a weekend or a holiday. The occupancy of a building typically has an effect the energy usage of the building.

The Energy and Cost Savings Calculation System may provide for energy cost savings. The Baseline energy usage may be arranged to support time-of-use (TOU) electric rates. Load forecasts may be prepared for each TOU period of the day. Separate TOU periods may be available for consumption and demand elements of the Rate. Additionally, the system may calculate energy savings using complex rates. For example, on-peak, shoulder, and off-peak consumption periods may be supported by the cost savings calculation. Demand windows also may be supported.

The Energy and Cost Savings Calculation System may provide for Weather Ranking. The weather data may be ranked to improve load forecasting accuracy. For example, errors and anomalies may be present in the NWS weather data. Errors and anomalies also may be present in weather data provided by other sources. The system may identify errors from the various sources, rank the sources, and select the source with the most accurate data.

The Energy and Cost Savings Calculation System may provide more accurate load forecasts than linear regression techniques, in part, by using more types of data than conventional linear regression techniques. Alternatively, the system may provide more accurate load forecasts by analyzing the accuracy of any data received and not accepting erroneous data.

The system may receive multiple data input streams, such as weather and energy data. The energy data may be interval data received from meters, from utility bills or simulations. The system also may use billing determinants and complex rates to calculate the cost and cost savings. Savings may be updated daily, and the results may be presented without a calculation error substantially distorting the results.

Additionally, the system may enhance accuracy by accepting energy use data for intervals smaller than monthly time periods (such as utility bills), which permits a larger number of variables to be utilized. For example, during testing, the MVNL load forecasting technology using daily data has proven to be approximately thirty times more accurate than utility bill-based linear regression techniques. The error rates associated with MVNL load forecasting using monthly Reporting Periods may be small enough such that approximate monthly energy and cost savings may be calculated. On the other hand, the monthly error rates associated with monthly utility bill-based linear regression calculating tend to distort the monthly results.

The Energy and Cost Savings Calculation System may enable many types of energy cost comparisons. The system may have two modes of operation. The first mode of operation may analyze energy usage and cost. The first mode may be manual and built upon case studies. The case studies may include evaluating variations in the rates, energy loads, equipment efficiency, operational changes, and facility additions. For example, the system may be run in the first mode to evaluate a new electric rate or to simulate the performance of changing aspects of plant operations, such as replacing chillers, fans, boilers, or other equipment.

The second mode of operation may monitor and calculate the energy and cost savings. The second mode may be on-going and automatic. For instance, the system may be run in the second mode to automatically report on the energy and cost savings of a performance contract.

III. Adjusted Cost Technology

The Energy and Cost Savings Calculation System may employ Adjusted Cost Technology (ACT). The Adjusted Cost Technology software may perform ad-hoc studies and present energy and rate analysis based upon one or more variables. The software may be used to generate monitoring and verification annual reports. Several energy data feeds may be accepted by the software. The Adjusted Cost Technology software has three primary elements, as illustrated in TABLE I below. The primary elements may be characterized as related to Adjusted, Energy, and Rate information. Additional, fewer, or alternate primary elements also may be used.

TABLE I

Adjusted Cost Technology (ACT)

| | |
|---|---|
| ADJUSTED | Loads may be modified to simulate different conditions. There may be two types of adjustment.<br>1. Baseline Extensions. Baseline extensions are due to changes in weather or occupancy. Using MVNL technology, these adjustments use the characteristics of energy usage during one period of time and apply it to the weather of another time period. It answers the question: "What would the energy usage be for the current time period if the energy system change had not been made?"<br>2. Scheduled Proportional Adjustments to Baseline Extensions. Scheduled proportional adjustments consider additions to buildings. The date rate adjustments become effective also may be taken into consideration. |
| ENERGY | Several data sources are considered<br>Interval data from automatically read meters<br>Utility bill data<br>Simulation<br>Manually read meter data<br>Time-of-Use energy use breakouts |
| RATE | Complex rates are considered. Complex rates may include time-of-use data, peak values, reactive power penalties, seasonal rate changes, fees, and taxes. |

The adjusted information may include modifying loads to simulate different conditions. There may be two types of adjustment. The first type of adjustment may be a Baseline Extension. The Baseline Extensions may take changes in weather or occupancy into consideration. By using MVNL technology, a Baseline Extension adjustment may apply the characteristics of energy usage during one time period to the weather of another time period. The Baseline Extension may be designed to determine what the energy usage would have been during the current year without a change in the energy system. Baseline Extensions may extend forward and backward in time.

The second type of adjustment may be a schedule proportional adjustment to a Baseline Extension. The schedule proportional adjustments may take into consideration building additions, demolitions, or expansions. The scheduled proportional adjustments also may reflect the date of rate adjustments becoming effective.

The energy information may take several data sources into consideration. The data sources may include interval data, utility bill data, simulation, and manually read meter data. The interval data may originate from automatically read meters.

The rate information may take complex rates into consideration. The complex rates may be determined in part by time-of-use data, peak values, reactive power penalties, seasonal rate changes, fees, and taxes.

Load forecasting technology has a number of applications. The applications may relate to (1) the quality control of data, (2) five-day forecasts, (3) weather-adjusted comparisons, (4) comparison of energy usage to a static, weather-adjusted Baseline, (5) calculation of cost savings that result from conservation measures, and (6) calculation of the cost of wasteful operations. The quality control of data may involve comparing expected values with actual values. The five-day forecast applications may include demand and consumption forecasts. The weather adjusted comparison applications may compare the current time period with a previous time period, such as the current year with last year or the current quarter or month with the same quarter or month of a previous year. Additional, fewer, or alternate applications also may utilize load forecasting technology.

The Energy and Cost Savings Calculation System may generate a number of detailed reports. For instance, load forecasting applications may compare a forecast with the actual data. In one application, energy usage data and reports may be sent electrically, such as by email, to customers. The application may use load forecasting technology to determine if the data collected is reasonable. Other reports may include comparative energy reports, rolling annual meter reports, rolling annual reports, performance contract project rolling annual reports, life of performance contract project reports, and various ad hoc roll-up reports.

IV. Exemplary Embodiments

FIG. 1 illustrates an exemplary data processor 110 configured or adapted to provide the functionality of the Energy and Cost Savings Calculation System. The data processor 110 includes a central processing unit (CPU) 120, a memory 132, a storage device 136, a data input device 138, and a display 140. The processor 110 also may have an external output device 142, which may be a display, monitor, a printer or a communications port. The processor 110 may be interconnected to a network 144, such as an intranet, the Internet, or an intranet connected to the Internet. The data processor 110 is provided for descriptive purposes and is not intended to limit the scope of the present system. The processor may have additional, fewer, or alternate components.

A program 134 may reside on the memory 132 and include one or more sequences of executable code or coded instructions that are executed by the CPU 120. The program 134 may be loaded into the memory 132 from the storage device 136. The CPU 120 may execute one or more sequences of instructions of the program 134 to process data. Data may be input to the data processor 110 with the data input device 138 and/or received from the network 144. The program 134 may interface the data input device 138 and/or the network 144 for the input of data. Data processed by the data processor 110 is provided as an output to the display 140, the external output device 142, the network 144 and/or stored in a database.

Figure 2:
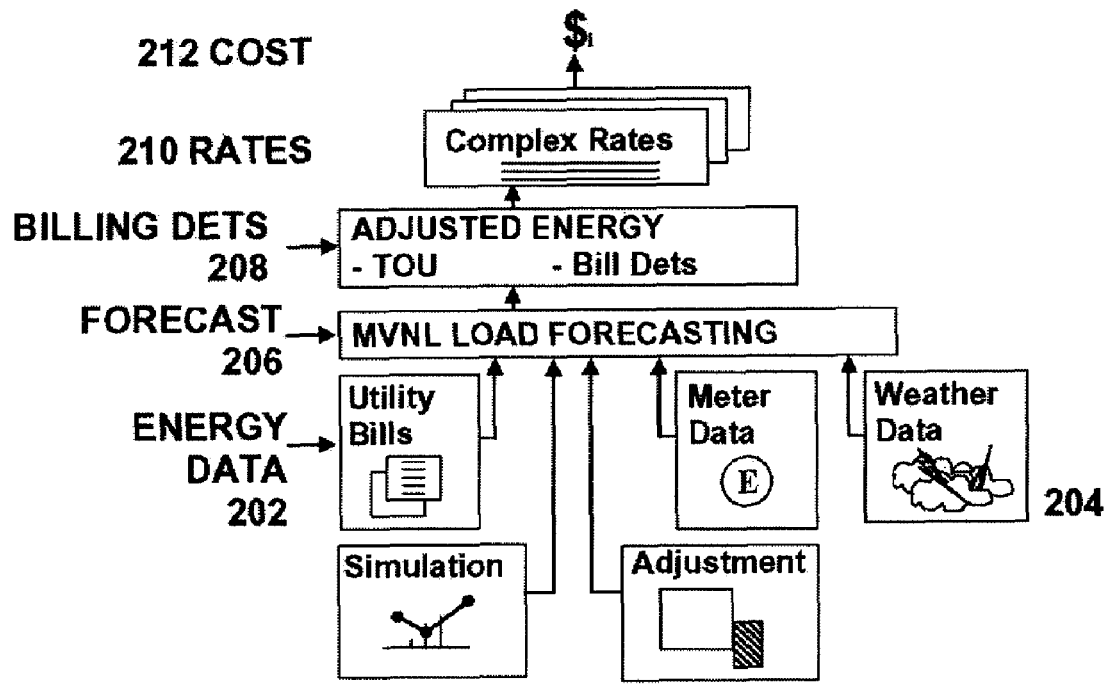
FIG. 2 is a schematic representation an adjusted cost system employed by the Energy and Cost Savings Calculation System.

FIG. 2 is a schematic representation of the Adjusted Cost Technology 200 employed by the Energy and Cost Savings Calculation System. As shown, in one embodiment, the system may receive energy data 202 and weather data 204 as input. The energy data 202 may originate from utility bills, simulations, adjustments, and/or meters. The weather data 204 may originate from a weather data provider, such as the National Oceanic and Atmospheric Administration (NOAA). The energy data 202 and weather data 204 may be used by a processor that performs load forecasting 206, such as MVNL load forecasting. The processor subsequently may use billing determinants 208 to adjust the load forecasting 206. The billing determinants 208 may include adjusted energy rates, such as energy rates adjusted for time of use. The processor may further adjust the load forecasting 206 based upon complex rate schedules 210 to determine a cost 212 or cost savings.

Figure 3:
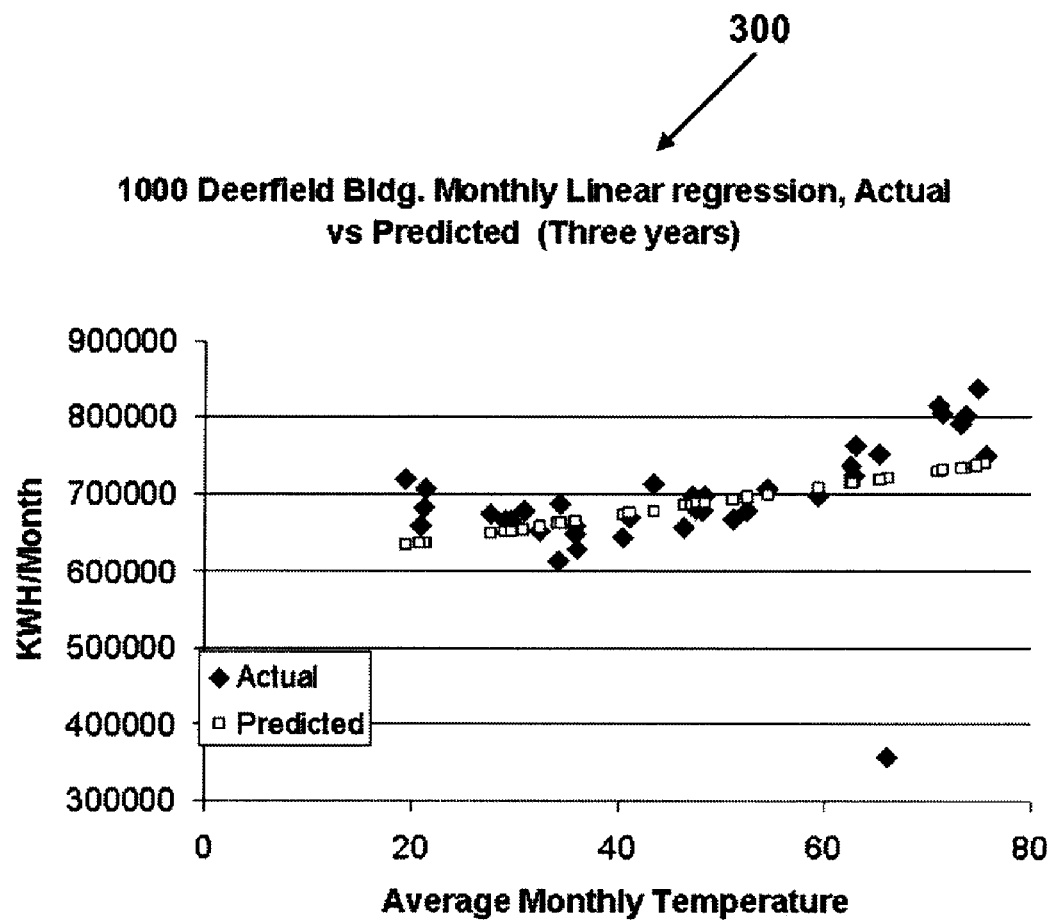
FIG. 3 illustrates an exemplary monthly linear regression load forecasting technique.

FIG. 3 illustrates an exemplary monthly linear regression load forecasting technique. For the example shown, the monthly energy usage was taken from utility bills. Daily high and low dry-bulb temperature data was obtained from the NWS. Subsequently, the monthly energy usage was compared to the average monthly outside air dry bulb temperature by means of a linear regression.

As shown by FIG. 3, the linear regression technique 300 plots a best fit straight line through the data points. Accordingly, the accompanying monthly error may be rather large. However, the error associated with linear regression may be reduced as the Reporting Period time increases. For example, the error trends towards zero as the Reporting Period increases to one year. Still, due to the errors associated with shorter time periods, the usefulness of a linear regression technique may be limited to calculating annual energy usage and savings.

More specifically, FIG. 3 shows actual loads 302 versus predicted loads 304 using a monthly liner regression technique 300 over a three year period. The predicted loads 304 are represented by square icons. The actual loads 302 are represented by diamond icons. As shown, the linear regression technique 300 provides an approximately straight line of the predicted load data 304 through the actual load data 302. The monthly linear regression technique 300 illustrated also utilized the average monthly temperature.

On the other hand, as noted above, MVNL load forecasting may use a number of different input variables or external parameters to forecast energy loads. For example, the input variables may include daily weather data, operational data, calendar data, and time-of-use data.

Figure 4:
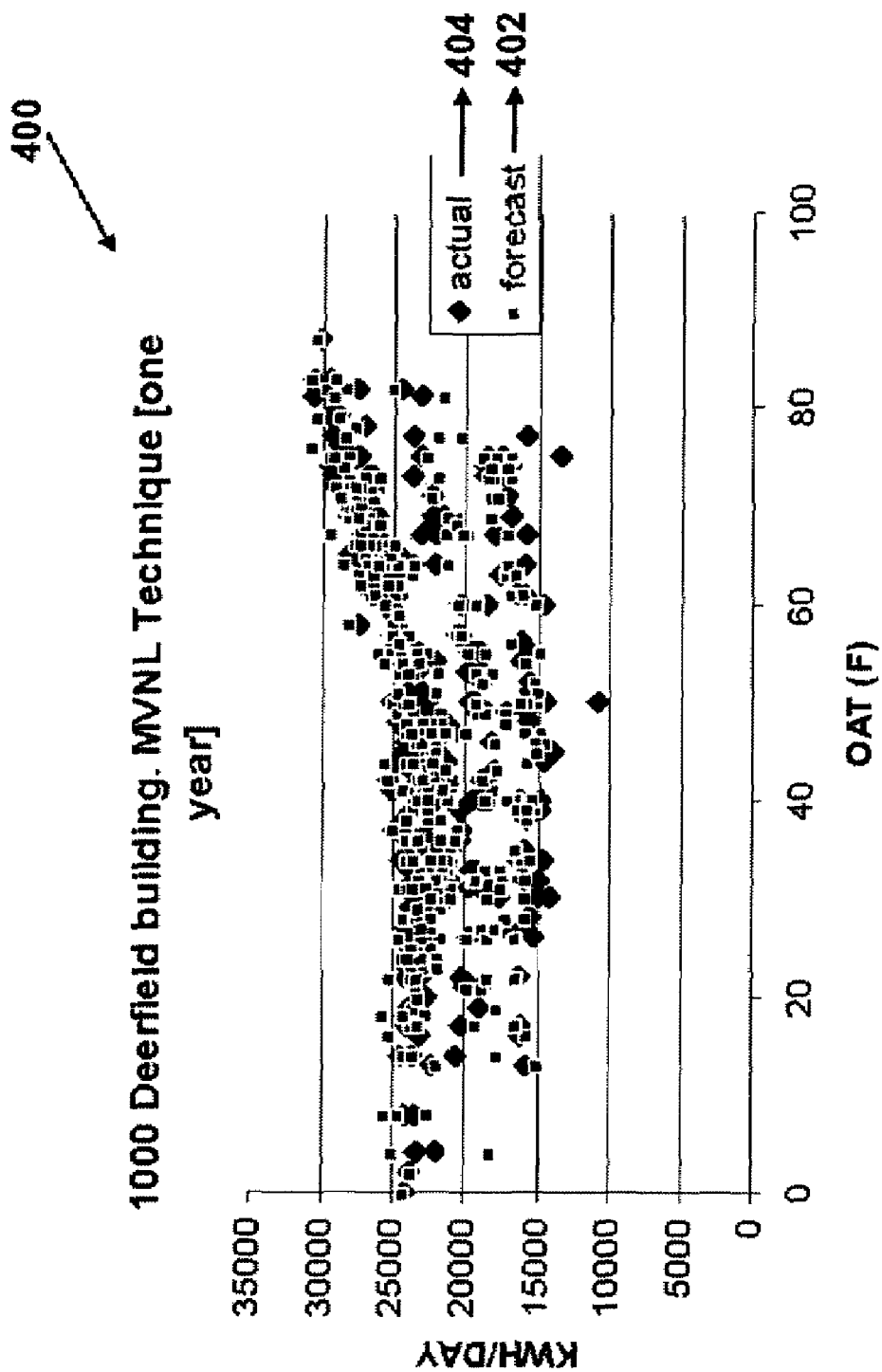
FIG. 4 illustrates an exemplary MVNL load forecasting technique.

FIG. 4 illustrates an exemplary MVNL load forecasting technique 400. The MVNL technique 400 shown uses the following as input: (1) daily weather data, (2) operational data, (3) calendar data, and (4) time-of-use data. The daily weather data may include dry-bulb temperature, dew point temperature, and solar condition data. The operational data may include type of use data, such occupied or unoccupied information. The calendar data may identify the day of week, the day of year, or the week of the year. The time-of-use data may include daily energy consumption data and daily energy peak data. Additional, fewer, or alternate external parameters may be utilized by the MVNL load forecasting technique 400.

An exemplary MVNL load forecasting technique is illustrated in Table II below. The MVNL load forecasting technique shown receives weather data corresponding to a number of weather parameters or variables and performs a simultaneous best fit solution for all of the variables, and subsequently generates a number of coefficients or constants to be determined corresponding to each weather parameter.

In particular, the exemplary load forecasting technique accepts data for a number of weather related variables. The weather related variables include AvgDayTemp (the average daily outside air temperature), SolarIndex (a measure of sunniness, the solar index varies between 0.3 and 1.0 depending on the amount of sunshine received during the day), Dewpoint (the average daily dew point temperature), DayType (a value that is 1 for weekdays and 0 for weekends and holidays), DayOfWeek (a number between 1 and 7, starting with 1 for Monday and ending with 7 for Sunday), and DayOfYear (a number between 1 and 366, starting with 1 for January $1^{st}$ and continuing sequentially throughout the days of the year). Data pertaining to additional, fewer, or alternative weather related variables also may be accepted as input.

TABLE II

Exemplary MVNL Load forecasting Technique

Multi-Variable, Non-Linear Model.
Used to Calculate Building Energy Values (Demand or Consumption)
  A. Independent Variables:
      AvgDayTemp - Average Daily outside Air temperature
      SolarIndex - Solar Index, a measure of "sunniness". Index varies between 0.3 and 1.0 depending
         on the amount of sunshine received during the day.
      Dewpoint - Average daily dew point temperature
      DayType - A value which is 1 for weekdays and 0 for weekends/holidays.
      DayOfWeek - Day of week number (varies between 1 and 7, where Monday = 1, etc)
      DayOfYear - Day of year number (varies between 1 and 366, where January 1st = 1, etc)
  B. Constants to be determined.
      $C_{01}, C_{11}, C_{21}, C_{31}, C_{02}, C_{12}, C_{22}, C_{32}, D_0, S_0, T_0, W_0, Y_0$.
  C. Equations
     1. Dewpoint:
       If "Dewpoint" is unknown, then simulate it with the following equation:
       Dewpoint =
       −0.996117744 − 0.429185771 * MinDayTemp − 0.642669651 * MaxDayTemp +
       2.04489578 * AveDayTemp − 11.2521308 * SolarIndex + 0.00509644 * DayOfYear;
     2. Building Energy Value:
       X = (AvgDayTemp + $S_0$ * SolarIndex * DayType)
       Building Energy Value = [Limit Building Energy value to a positive number]
         $D_0$ * Dewpoint                               [for range of effectiveness]
         +$C_{01}$ + $C_{11}$ * X + $C_{21}$ * $X^2$ + $C_{31}$ * $X^3$     [where Temp is less than
                                                          changeover temp.]
         +$C_{02}$ + $C_{12}$ * X + $C_{22}$ * $X^2$ + $C_{32}$ * $X^3$ TABLE II-continued Exemplary MVNL Load forecasting Technique

[where Temp is greater than changeover temp.]

+ $T_0$ * DayType
+ $W_0$ * DayOfWeek
+ $Y_0$ * sin ((DayOfYear-80) * 2 * pi/365)

The constants to be determined in the example shown include $C_{01}$, $C_{11}$, $C_{21}$, $C_{31}$, $C_{02}$, $C_{12}$, $C_{22}$, $C_{32}$, $D_0$, $S_0$, $T_0$, $W_0$, and $Y_0$. $C_{01}$, $C_{11}$, $C_{21}$, and $C_{31}$ are constants associated with a first polynomial equation where temperature is less than the changeover temperature. $C_{02}$, $C_{12}$, $C_{22}$, and $C_{32}$ are constants associated with a second polynomial equation where temperature is greater than the changeover temperature. The changeover temperature is the temperature at which a building heating and cooling system switch, with one becoming operative and the other inoperative. The change over temperature is typically about 65 degrees Fahrenheit. $D_0$ is a constant associated with the dew point temperature. $S_0$ is a constant associated with the solar index. $T_0$ is a constant associated with the type of day. $W_0$ is a constant associated with the day of the week. $Y_0$ is a constant associated with the day of the year. Additional, fewer, or alternative constants also may be determined.

If no dew point temperature data is available, the exemplary load forecasting technique calculates an estimated dew point temperature. The estimated dew point temperature is based upon a dew point constant (−0.996117744 in the example of shown), the minimum day temperature (MinDayTemp), the maximum day temperature (MaxDayTemp), the average day temperature (AvgDayTemp), the solar condition (SolarIndex), and the day of the year (DayOfYear). The MinDayTemp, the MaxDayTemp, the AvgDayTemp, the SolarIndex, and the DayOfYear variables may each be multiplied by a corresponding constant. Additional, fewer, or alternative factors also may be used to estimate dew point temperature.

Subsequently, the exemplary load forecasting technique calculates energy demand or consumption by solving a single equation based upon input data corresponding to the average daily temperature, the type of day (either occupied or unoccupied), the solar condition, the day of the year, the day of the week, and the dew point temperature. Additional, fewer, or alternate variables also may be used to calculate energy demand.

More specifically, as shown in Table II, the exemplary load forecasting technique calculates energy demand or consumption by calculating a variable X that represents the average daily temperature (AvgDayTemp) plus a solar constant ($S_0$) multiplied by the solar condition (SolarIndex) multiplied by the type of day (DayType). The building energy value, representing either demand or consumption, may then be computed. However, the building energy value should be limited to only positive numbers.

In the example illustrated by Table II, the building energy value equals the sum of (1) either the actual or calculated dew point (Dewpoint) multiplied by a dew point constant ($D_0$), (2) a first polynomial equation, (3) a second polynomial equation, (4) the type of day (DayType) multiplied by a day type constant ($T_0$), (5) the day of the week (DayOfWeek) multiplied by a day of the week constant ($W_0$), and (6) a seasonal equation multiplied by a day of the year constant ($Y_0$).

In the example shown, the Dewpoint multiplied by $D_0$ calculation estimates the effect that the dew point has upon energy load and cost, which varies dependent upon the season of the year. The first polynomial equation estimates the effect of the temperature being less than the changeover temperature upon energy load and cost. The second polynomial equation estimates the effect of the temperature being greater than the changeover temperature upon energy load and cost.

Additionally, the DayType multiplied by $T_0$ calculation estimates the effect of building occupancy upon energy load and cost. The DayOfWeek multiplied by $W_0$ calculation estimates the effect of the specific day of the week upon energy load and cost. The seasonal equation multiplied by $Y_0$ calculation estimates the effect of seasonal changes upon energy load and cost.

Moreover, other equations and calculating techniques may be used to calculate energy or cost savings for a building conservation measure. Other non-linear or polynomial regressions may be used other than the example shown in Table II above. For example, a polynomial regression solving for estimated energy load may use any combination of various outside air temperatures, solar conditions, day classifications, or seasonal information as inputs. Additionally, a neural network or other software engine that provides for the simultaneous solution of multiple equations may be used by the Energy and Cost Savings Calculation System.

The MVNL load forecasting technique 400 may produce a small monthly error and the annual error may trend toward zero. The MVNL load forecasting technique 400 may calculate forecast data points 402 that "blanket" or closely reflect the actual data points 404. The blanketing of the data results in part from the additional, as well as the specific, parameters used. The MVNL load forecasting technique may produce a calibrated simulation which solves for energy consumption and peak load in each defined time-of-use period for each day using the above-mentioned inputs. The MVNL technique 400 may be used to forecast daily, weekly, monthly, quarterly, semi-annual, annual, or other time period energy usage.

More specifically, FIG. 4 shows the actual loads 404 versus the forecast loads 402 predicted by the MVNL technique 400 over a one-year period. The actual loads 404 again are represented by diamond icons. The forecast loads 402 are represented by square icons. As shown, the MVNL load forecasting technique 400 approximately mirrors the actual data, providing forecast loads 402 that more accurately predict the actual loads 404.

Table III below provides a comparison of the linear regression and MVNL load forecasting techniques. The linear regression technique may be based upon pre-existing utility bills and rely upon few data elements, resulting in relatively large monthly errors. On the other hand, the MVNL technique may be based upon numerous external parameters for which the data is automatically obtained and updated on a daily basis, which facilitates the production of small monthly errors. For instance, the MVNL technique may use interval data received automatically from meters. In the examples shown, the monthly linear regression error is approximately 32 times larger than the monthly error of the MVNL technique.

TABLE III

Comparison of Load forecasting Techniques

| | Linear Regression [Monthly Utility Bill-based] | MVNL [Interval Meter Data-based] |
|---|---|---|
| Data Points | One per month | 2900 per month (based on 15-minute interval data) |
| Update Frequency | Monthly | Daily |
| Time Lag | 4-6 weeks to receive the utility bill | 4-6 hours after the end of the day to receive results |
| Load Adjustments Based on: | OA dry bulb temperature | OA dry bulb temperature OA dew point temperature Solar condition Time-of-Use periods Day type (WD/WE/HOL) Day of week Day of year |
| Model | Single variable, linear regression | Multi-variant, non-linear model that reflects how inputs affect facility energy usage |
| Accuracy | Daily Error: Does not apply Monthly Error: ~5%-to-15% Annual Error: ~0%-to-1% | Daily Error: 2%-to-5% Monthly Error: 0.2%-to-0.6% Annual Error: ~0% |

The goal of using any load forecast simulation is to keep the variation between metered and simulated (i.e., "forecast") values sufficiently small so as not to interfere with the application. For example, a simulation error of 1% may be acceptable if one is simply predicting the peak electric load for tomorrow. However, a simulation error of 1% for a load forecast used to calculate energy savings will probably distort the analysis if combined with savings measures that produce actual energy savings between 1 and 2%.

Figure 5:
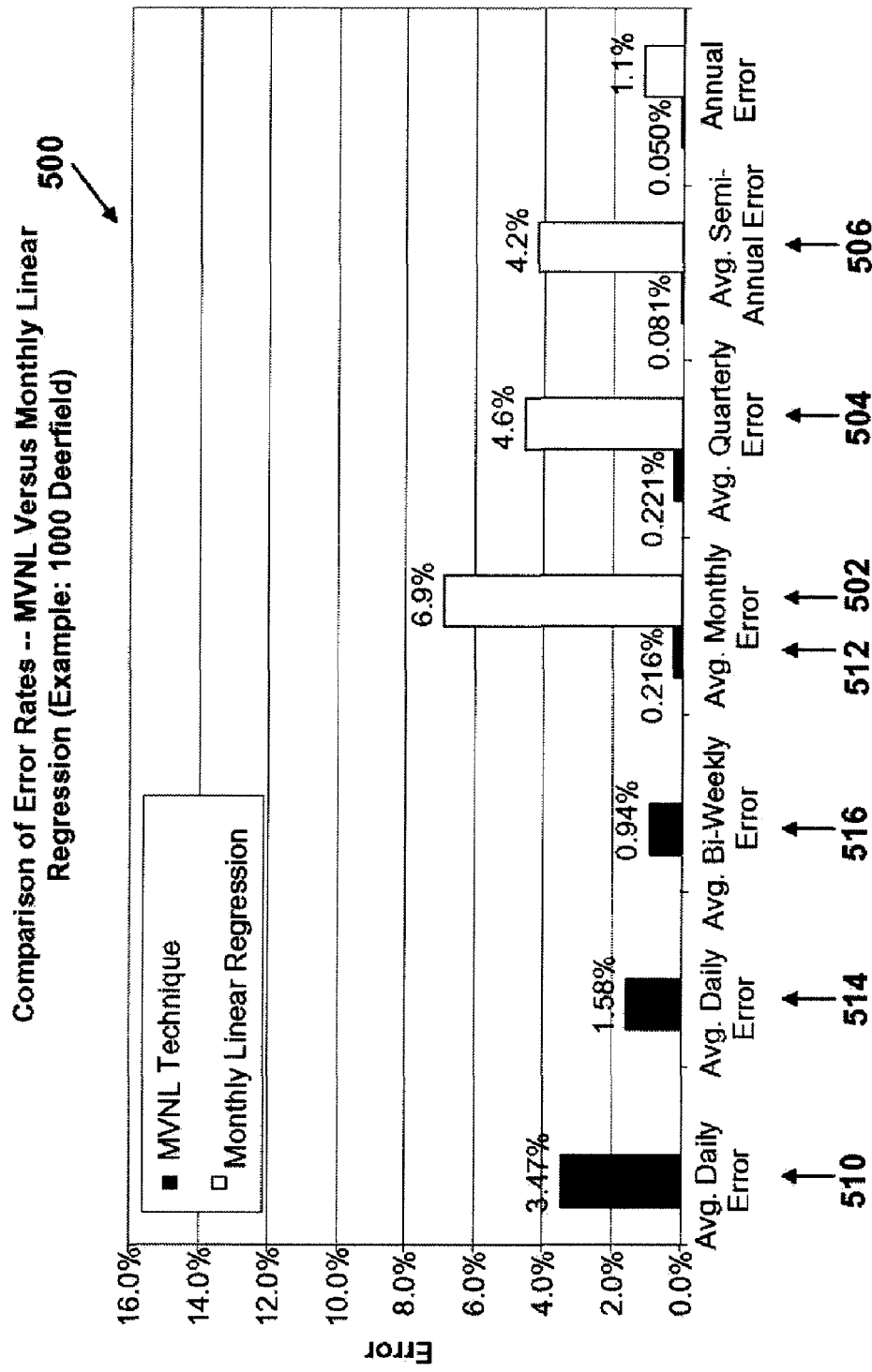
FIG. 5 illustrates a comparison of error rates produced from MVNL and monthly linear regression load forecasting.

FIG. 5 illustrates a comparison of the error rates produced from MVNL and monthly linear regression load forecasting 500. As shown, the average monthly error 502 of conventional linear regression techniques is approximately 7% and the average quarterly error 504 and the average semi-annual error 506 of conventional linear regression techniques may be 4.6% and 4.2%, respectively. Hence, the error rates associated with linear regression techniques may be unacceptable due to the accompanying financial uncertainty. Accordingly, in one embodiment, the Baseline Extension error should be less than 10% of the savings. For example, if savings are 10%, the Baseline Extension error should be 1.0% or less of the savings to avoid distorted results.

FIG. 5 also shows a comparison of the average daily, weekly, bi-weekly, monthly, quarterly, semi-annual, and annual average error rates of the MVNL and linear regression techniques. For an annual calculation, both techniques trend toward 0% error. However, for linear regression techniques, this result may be explained in part because the inaccuracies tend to cancel the effect of each other as the time period is lengthened. Therefore, as more data points are used, the net effect is that the average error is reduced.

Load calculations based upon monthly linear regression techniques may have average errors which distort the energy or cost savings calculations. The MVNL technique, on the other hand, may provide daily updates based upon 15-minute data. The time period for the MVNL technique may be a day. As shown in FIG. 5, the average daily error 510 may be much less than the average monthly error 502 of the monthly linear regression technique. A five-day peak load forecasting application may further reduce the average error to more acceptable levels. Moreover, for comparative energy or cost savings applications, the average monthly error 512 is small enough such that distorted monthly results do not occur or are minimal. In some instances, weekly or bi-weekly data also may be used without severe distortion due to average weekly errors 514 or average biweekly errors 516. Therefore, the MVNL load forecasting technique may produce more accurate energy and cost savings calculations than linear regression techniques.

Furthermore, the MVNL load forecasting technique may utilize interval meter data as an input, while linear regression techniques may be based upon monthly utility bills. The interval data may be obtained after the installation of metering equipment. The metering equipment may provide current data automatically. The readily accessible interval data may contribute to the reduction of the error rates accompanying each time period.

Additionally, even if no single utility bill is available, interval data may still be obtainable. For instance, in situations where no single overall utility bill for an entire building is available, such as when sub-metering is utilized, the MVNL technique may still be used to calculate energy and cost savings. Sub-metering may monitor the energy usage of certain portions of a building or individual pieces of equipment. The MVNL technique also may be utilized in situations where more frequent updating, such as daily, weekly, or bi-weekly, or more accurate monthly updating is either desired or required.

As noted above, the second mode of operation of the Energy and Cost Savings Calculation System may track energy and cost savings. The second mode may operate continuously and automatically. The second mode also may calculate ideal savings, actual savings, forecast savings, actual slip, and future slip of an environmental management system.

The second mode may utilize Baseline Extensions, Reference Period Modifications, actual analysis, and forecast analysis. The Baseline Extensions and Reference Period Modifications may provide energy usage and cost based upon consumption characteristics from another time period, i.e., use analysis of past data. The actual analysis may provide analysis of the actual energy usage and cost without adjustments. The actual analysis also may provide analysis based upon the most current or real-time data. The forecast analysis may provide analysis of anticipated or future energy usage and cost.

Figure 6:
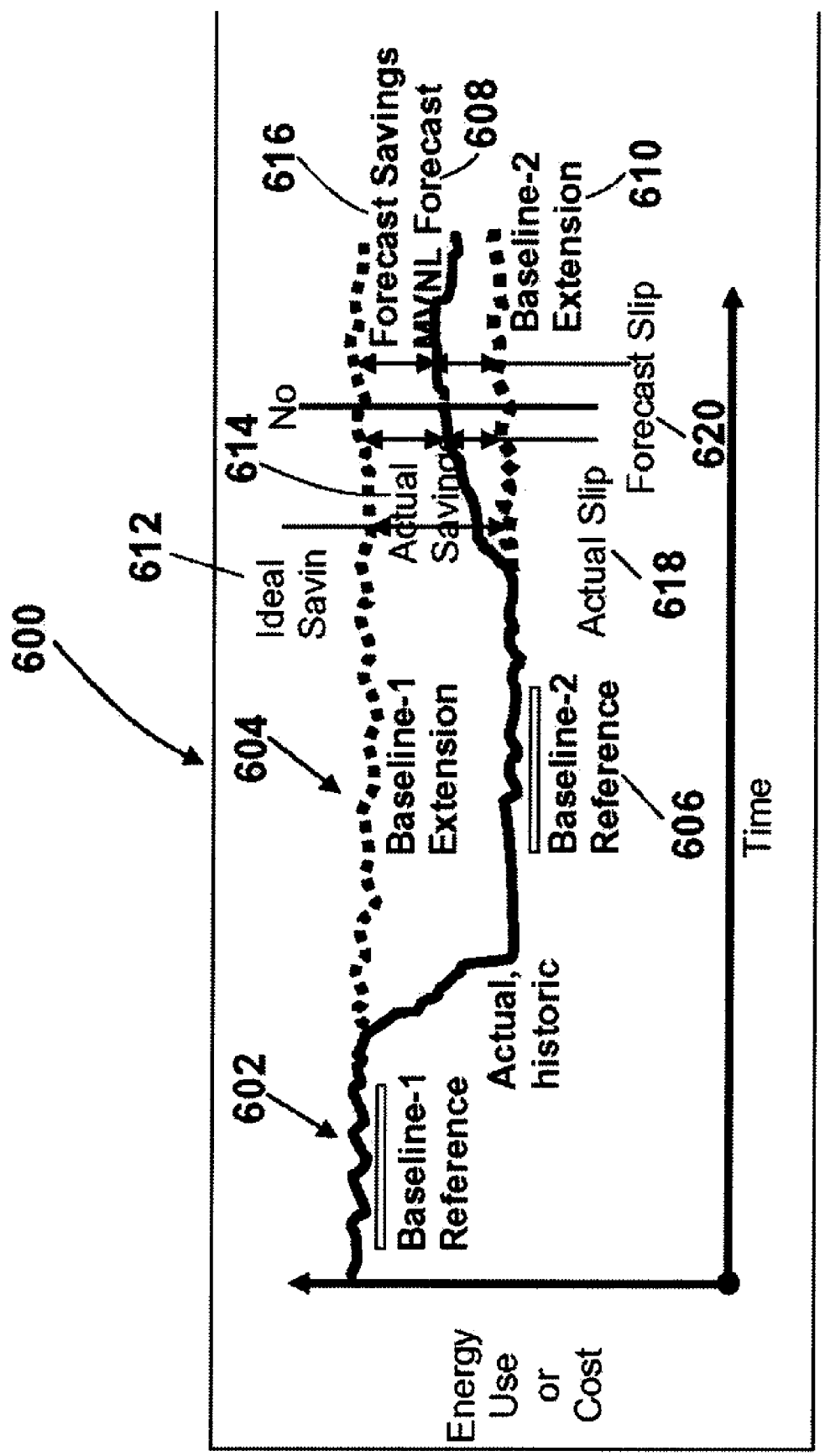
FIG. 6 illustrates a second mode of operation of the Energy and Cost Savings Calculation System.

FIG. 6 illustrates the second mode of operation 600 of the Energy and Cost Savings Calculation System. The second mode 600 may calculate or establish a first Baseline Reference 602 that estimates the energy usage prior to any retrofits or energy conservation measures being made to an environmental management system or building. The first Baseline Reference 602 may be extended to the present time period and beyond by a first Baseline Extension 604.

The second mode 600 also may calculate or establish a second Baseline Reference 606 that estimates the energy usage subsequent to retrofits or energy conservation measures being made to an environmental management system or building. The second Baseline Reference 606 may be extended, taking more recent or current conditions into consideration, to provide (1) an updated actual energy usage curve for the recent past and present, and (2) an anticipated or future energy use and cost curve, as shown by the MVNL Forecast curve 608. The second Baseline Reference 606 also may be extended to the present time period and beyond by a second Baseline Extension 610.

The Energy and Cost Savings Calculation System may calculate the Ideal Savings 612 by subtracting the second Baseline Extension 610 from the first Baseline Extension 604. The system may calculate the Actual Savings 614 by subtracting the actual energy usage from the first Baseline Extension 604. The Forecast Savings 616 may be calculated by subtracting the MVNL Forecast curve 608 from the first Baseline Extension 604.

The Slip is the amount of energy and cost savings expected but not actually realized. The Actual Slip 618 may be calculated by subtracting the second Baseline Extension 610 from the actual energy usage. The Forecast Slip 620 may be calculated by subtracting the second Baseline Extension 610 from the MVNL Forecast curve 608.

V. Exemplary Reports

FIG. 7 illustrates an exemplary weather and energy report. The report may provide energy usage and weather information. The report may be delivered as an email message or an email attachment. FIG. 7 shows the "Actual" and "Expected" entries within the "Weather and Energy Report." The Expected entry is based upon a MVNL load forecast of near-term historic data. The Expected entry may be used as a daily benchmark of the previous day's operation.

Load forecasting applications may prepare five-day forecasts of demand and consumption. For example, the MVNL load forecasting technique may be used to predict the peak electric and daily energy consumption for the next five days. The predictions may be based upon weather forecasts and operational schedules. FIG. 7 also shows an exemplary five-day weather and energy report.

Load forecasting applications may prepare weather-adjusted comparisons, including a comparison of the current year with the previous year. A comparison of the present year's energy usage with last year's usage may provide useful information. However, because various factors are not the same for different years, adjustments may be necessary. Accordingly, the MVNL load forecasting technique may be used to make weather and operational adjustments. Furthermore, another adjustment may be made to account for internal load changes. Additional, fewer, or alternate adjustments also may be performed.

FIG. 8 illustrates an exemplary comparative energy use report that displays weather-adjusted comparisons. As the monthly error rate of the MVNL technique may be quite low, the monthly entries in the report may have minimal distortion. Comparative energy use reports also may be used to track energy usage for ISO-14001 certification where continuous improvement is sought.

Figure 9:
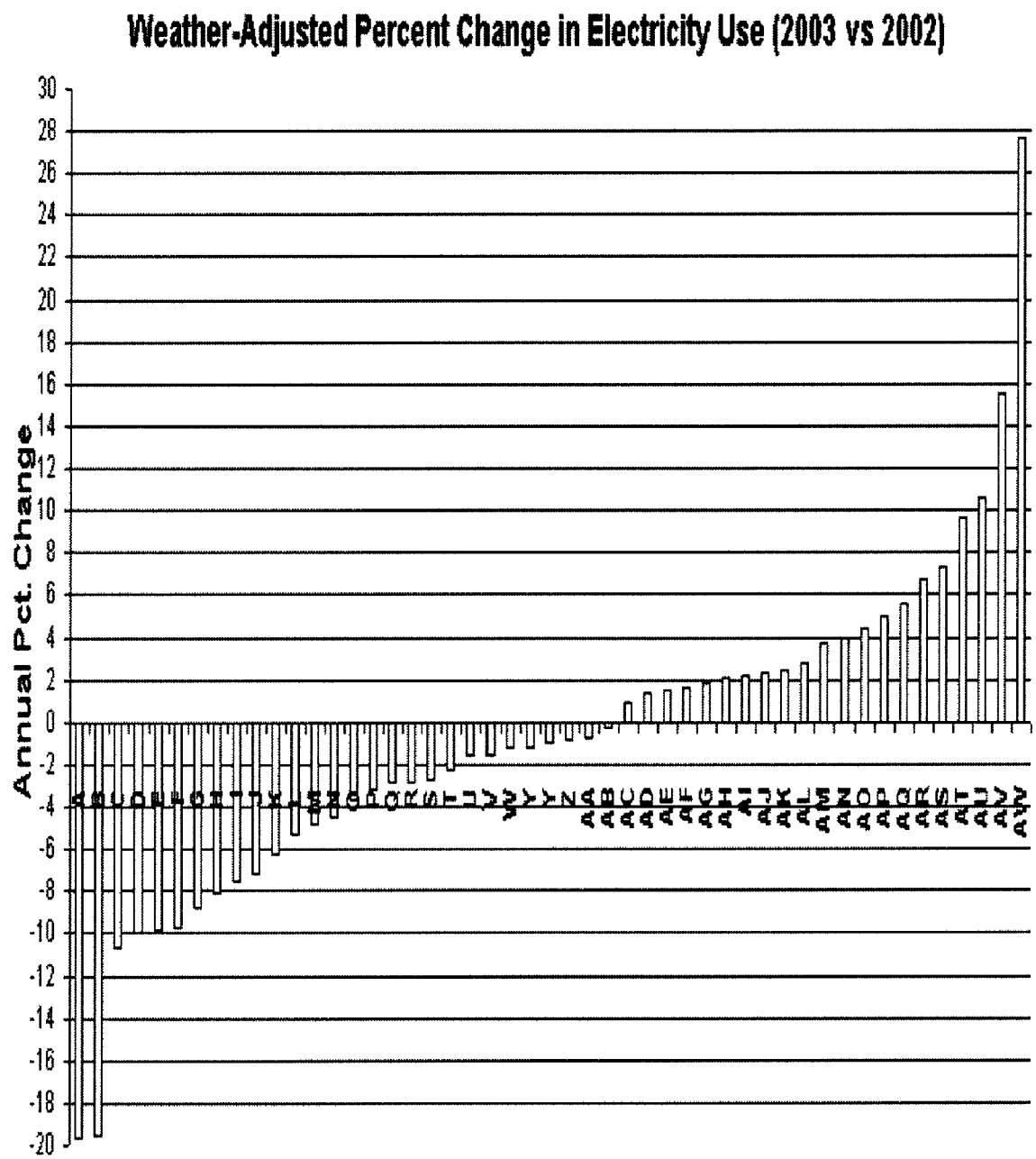
FIG. 9 illustrates weather-adjusted percentage change in annual electricity usage.
Figure 10A:
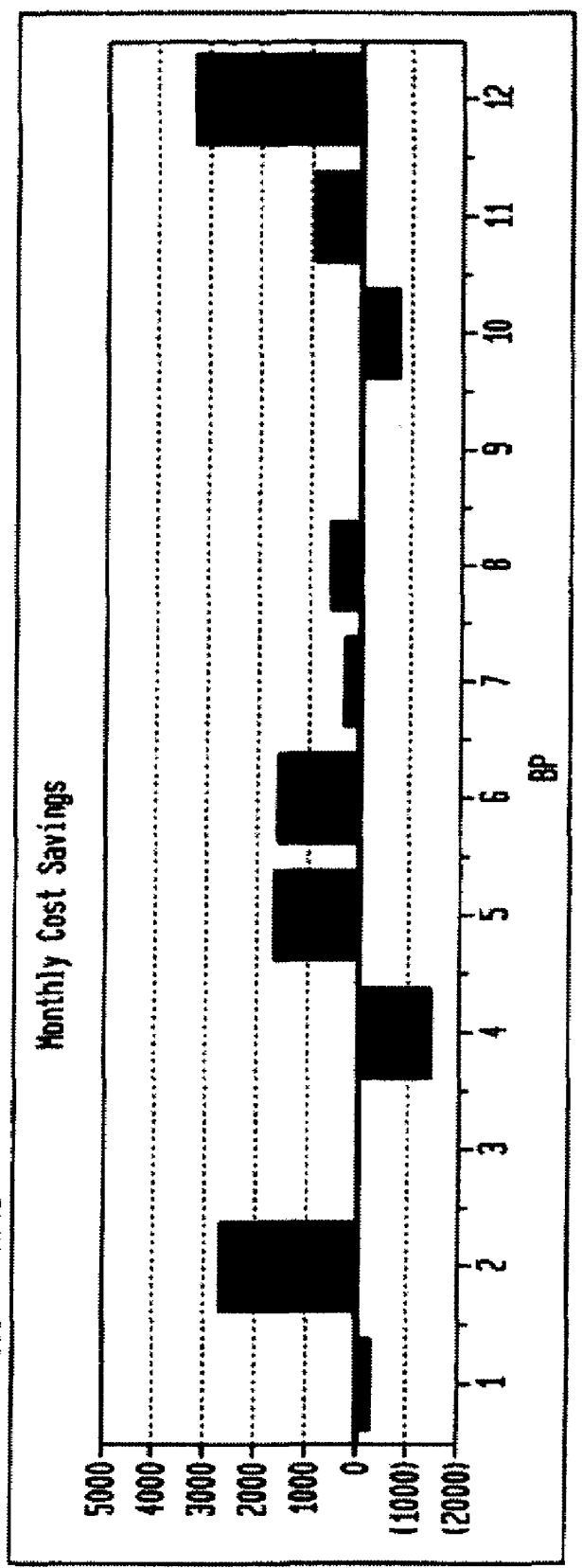

A weather-adjusted comparison may present an expected range of operational changes. The illustrative comparative energy use report discussed above was run for 49 facilities comparing the current year's power consumption against the previous year's weather-adjusted power consumption. The results are shown in FIG. 9, which illustrates weather-adjusted percentage change in annual electricity usage.

The percentage change of power used in the example shown ranges from −10% to +10%. FIG. 9 does show discontinuities at the extreme left (decrease) and the extreme right (increase). However, it should be noted that the two data entries at the far left represent faulty data due to monitoring difficulties as the meter was bypassed for several months during renovations. Additionally, the two entries at the far right represent faulty data due to more loads being added during the time period being monitored. On the other hand, the entries in the middle represent accurate data for a facility during the time period being monitored. As a result, one conclusion to be drawn is that operational changes, both positive and negative, may have a weather-adjusted net annual effect of between −10% to +10% in energy usage.

Load forecasting applications may compare energy usage to static, weather-adjusted Baselines and Basic Reference Periods. Many times, a static or fixed reference period is used for comparison. For example, a period before a major change is made may be used as the Baseline against which future energy consumption is to be measured. However, instead of being the previous year or time period before an energy conservation measure is employed, the Baseline may be a predefined static time period. The Comparative Energy Use Report shown in FIG. 8 also may be used as a reference.

Load forecasting applications may calculate the cost of wasteful operations. The same method that calculates savings can be used to calculate the cost of wasteful operations. FIGS. 10A through 10F illustrate a monitoring and verification (M&V) annual meter report. The M&V annual meter report shown also may be used to quantify excessive cost practices. The MVNL technique may be imbedded within the calculations. The small monthly error of the MVNL load forecasting technique means that wasteful operations may be accurately documented each month.

More specifically, FIGS. 10A through 10F illustrate the monthly cost savings over a twelve month period. For the example shown, an office building during one calendar year was compared to a weather-adjusted calendar year. The report shows a 1.3% reduction in power consumption with a 3.8% average increase in monthly peak loads. However, the on-peak electric rate for the Actual On-Going table was $0.05599/KWH, whereas the on-peak electric rate for the Baseline table was $0.06000/KWH. All other rate elements were the same. The resulting annual cost savings was over $8,000. If the rates were the same for the Baseline and the Actual On-Going tables, the results would have been a net annual increase in costs, i.e., waste, of approximately $4,400.

In sum, the Energy and Cost Savings Calculation System uses a MVNL load forecasting technique that is more accurate than the utility bill-based linear regression techniques. The MVNL technology enables monthly, weekly, and even daily load forecasting to be achieved with acceptable accuracy. The MVNL technique may utilize interval meter data that is automatically received by the system. The system may remove the limitation of monitoring only the main utility meter via monthly bills. Additionally, with the availability of MVNL using interval meter data, meters may be installed wherever they are needed. For example, if a chiller plant is retrofitted, a meter dedicated to the chiller plant may provide data for that specific conservation measure. As a result, the dilution of any energy and cost savings calculations by other parts of the facility, such as would be the case with utility bill-based monitoring of the main electric meter, may be revented.

While the preferred embodiments of the invention have been described, it should be understood that the invention is not so limited and modifications may be made without departing from the invention. The scope of the invention is defined by the appended claims, and all devices that come within the meaning of the claims, either literally or by equivalence, are intended to be embraced therein.

It is therefore intended that the foregoing detailed description be regarded as illustrative rather than limiting, and that it be understood that it is the following claims, including all equivalents, that are intended to define the spirit and scope of this invention.

What is claimed is:

1. A method of forecasting energy loads, the method comprising:
   forecasting an energy load for a building using a multi-variant non-linear (MVNL) load forecasting technique, the MVNL load forecasting technique accounts for the effect of weather in forecasting the energy load by modifying a reference period having associated energy and weather data such that the weather data of the reference period as modified approximately matches weather experienced during a current reporting period to provide an indication of the effect of weather on energy usage during the current reporting period.

2. The method of claim 1, the method comprising:
   receiving solar condition data associated with at least one solar condition from a weather data provider; and
   assigning the at least one solar condition a corresponding numerical value, wherein the MVNL load forecasting technique uses the corresponding numerical value to account for the effect of solar conditions on building thermal load.

3. The method of claim 1, the method comprising extending a baseline of energy usage data to account for changes in weather or building occupancy, wherein the MVNL load forecasting technique uses the baseline extension in forecasting the energy load.

4. The method of claim 1, wherein the MVNL load forecasting technique uses a schedule proportional adjustment to the baseline extension in forecasting the energy load, wherein the schedule proportional adjustment accounts for a change associated with the building.

5. The method of claim 1, wherein the MVNL load forecasting technique accounts for a changeover temperature in forecasting the energy load, the changeover temperature being the temperature at which a building heating system and a building cooling system switch, with one system becoming operative and the other system becoming inoperative as temperature crosses the changeover temperature.

6. The method of claim 1, the method comprising receiving interval data automatically read from meters, the automatically read interval data being used by the MVNL load forecasting technique in forecasting the energy load.

7. The method of claim 1, the method comprising:
   establishing a baseline from collected weather and energy usage data;
   dividing the baseline into a plurality of reference periods, each of the plurality of reference periods having a separate temperature range and corresponds to a specific time period;
   identifying the reference period from among the plurality of basic reference periods having associated weather data representing past weather that approximately matches weather experienced during the current reporting period.

8. The method of claim 7, the method comprising modifying the weather data associated with the reference period if the outside air temperature of the current reporting period is outside a temperature range associated with the reference period.

9. The method of claim 8, wherein the modification to the the weather data associated with the reference period involves extending the reference period further backward and/or forward in time until the outside air temperature of the current reporting period falls within a temperature range associated with the reference period as modified.

10. The method of claim 1, the method comprising:
    calculating a first baseline reference that estimates an energy usage prior to a retrofit or an energy conservation measure being implemented;
    extending the first baseline reference forward in time subsequent to a retrofit or an energy conservation measure being implemented to form a first baseline extension; and
    calculating an actual savings associated with the retrofit or the energy conservation measure by subtracting an actual energy usage from the first baseline extension.

11. The method of claim 10, the method comprising:
    calculating a second baseline reference that estimates an energy usage subsequent to a retrofit or an energy conservation measure being implemented;
    extending the second baseline reference to the present time period and beyond to form a second baseline extension;
    calculating the ideal savings associated with the retrofit or the energy conservation measure by subtracting the second baseline extension from the first baseline extension; and
    calculating an actual slip by subtracting the second baseline extension from the actual energy usage.

12. The method of claim 1, the method comprising:
    preparing load forecasts for the building for each time-of-use period associated with a time-of-use electric rate; and
    calculating energy savings using complex rates.

13. A method of forecasting energy loads, the method comprising:
    receiving weather data associated with a plurality of weather parameters;
    receiving energy data associated with energy usage;
    performing Multi-Variant Non-Linear (MVNL) load forecasting using the weather data and the energy data received as inputs;
    adjusting the load forecasting based upon billing determinants; and
    further adjusting the load forecasting based upon complex rate schedules to determine a cost or cost savings, wherein the MVNL load forecasting modifies a reference period having associated energy and weather data such that the weather data of the reference period as modified approximately matches weather experienced during a current reporting period to provide an indication of the effect of weather on energy usage during the current reporting period.

14. The method of claim 13, wherein the billing determinants include energy rates adjusted for time of use and the complex rates include on-peak, shoulder, and off-peak consumption periods.

15. The method of claim 13, wherein load forecasts are prepared for each time-of-use period of the day, with each time-of-use period having associated consumption and demand elements.

16. The method of claim 13, wherein the MVNL load forecasting accounts for the effect of solar conditions on thermal load in forecasting the energy load.

17. A method of forecasting energy loads, the method comprising:
　establishing a baseline from weather and energy data collected;
　dividing the baseline into basic reference periods corresponding to specific time periods, each of the basic reference periods having a corresponding weather data set;
　identifying a past weather data set associated with a basic reference period from among all of the weather data sets that most closely resembles weather during a current reporting period; and
　using past energy usage associated with the past weather data set identified as a starting point in calculating energy usage during the current reporting period, wherein if outside air temperature of the current reporting period is outside a temperature range associated with the basic reference period, adjusting the past weather data set associated with the basic reference period to more accurately reflect the weather during the current reporting period.

18. The system of claim 17, wherein the adjustment to the past weather data set associated with the basic reference period extends the basic reference period further backward and/or forward in time within the baseline such that the basic reference period as modified more accurately represents actual outside air temperature of the current reporting period.

* * * * *